May 12, 1970  H. J. HALL ET AL  3,511,030
METHODS AND APPARATUS FOR ELECTROSTATICALLY CLEANING
HIGHLY COMPRESSED GASES
Filed Feb. 6, 1967  5 Sheets-Sheet 1

INVENTORS
HERBERT J. HALL
ROBERT F. BROWN
MYRON ROBINSON

BY *Stowell & Stowell*
ATTORNEYS

INVENTORS
HERBERT J. HALL
ROBERT F. BROWN
MYRON ROBINSON
BY *Stowell & Stowell*
ATTORNEYS 3,511,030
METHODS AND APPARATUS FOR ELECTRO-
STATICALLY CLEANING HIGHLY COM-
PRESSED GASES
Herbert J. Hall, Skillman, Robert F. Brown, Piscataway
Township, Myron Robinson, Highland Park, N.J., as-
signors to Research-Cottrell, Inc., Bridgewater Town-
ship, N.J., a corporation of New Jersey
Filed Feb. 6, 1967, Ser. No. 614,168
Int. Cl. B03c 3/00
U.S. Cl. 55—129                                      6 Claims

ABSTRACT OF THE DISCLOSURE

An apparatus for removal of fine suspended particles from highly compressed gases by electrostatic precipitation comprising fine discharge electrodes producing a negative corona to raise the sparkover voltage and critical relative density, heated discharge electrodes and flow constrictions for lowering the corona-starting voltage, the high-voltage power supply being disposed within the compressed gas volume, the negative corona discharge obtained being above the critical relative density of the system.

Background of the invention

In recent years, the problem of removing particles entrained in gases in various chemical and physical processes has increased markedly in importance. Particulate contaminants foul heat exchangers and catalyst beds in chemical processing, erode turbo-machinery, introduce explosion hazards in process equipment, and lower efficiency and raise maintenance costs in gas-transport systems. In still other areas of application, the stringent requirements for supercleanliness in the aerospace industries and the growing sophistication of industrial system components focus attention on the technical and economic problems of fine-particle removal.

In general in the prior art, attention has centered on the applicability of available particle collectors, such as those used, for example, in recovery of valuable material from gas streams or in the control of air pollution. Common experience with these devices is, however, confined to conditions of substantially lower pressures and temperatures than those often occurring in the new problem areas. The requirements for the new gas-cleaning systems cover ranges which are significantly broader than heretofore experienced commercially, from cryogenic temperatures to temperatures over 1500° F., and from subatmospheric pressures to pressures over 5,000 p.s.i.

Commonly used gas-cleaning devices of the prior art are mechanical collectors of various types and electrostatic precipitators. The mechanical collectors are of two chief varieties: inertial such as impingement, cyclone and mechanical-centrifugal and filtrational such as granular-bed and fabric. Of the foregoing, only inertial separators and electrostatic precipitators are effective in the removal of entrained liquid-droplet contaminants from gases and the system of the invention is particularly suited for use with such contaminants.

A principle disadvantage of inertial separators relative to electrostatic precipitators is the requirement of the former to accelerate to high velocities the entire mass of gas treated in order to impress adequate separating forces on the individual particles of contaminants. Filtrational devices are subject to a similar disadvantage as substantial pressures are required to force the entire body of gas to be treated through the interstices of the filtering medium.

An electrostatic precipitator, on the other hand, causes separating forces to be exerted on the particles directly, leaving the mass of gas substantially undisturbed by those forces. Since an important mechanism of particle formation in high-pressure, high-temperature systems is condensation, gas cleaning is often associated with extremely fine particles, commonly submicron in size.

Separation of such fine particles from dense, high-pressure gases entails an increase in power input over the already high power levels required by inertial or filtrational devices. Consequently, in mechanical separators, it is not generally practical, either technically or economically, to achieve very high efficiencies in removing fine particles from large volumes of high-pressure gases.

The electrostatic precipitation process is not, however, subject to these debilities, for, as to be more fully disclosed hereinafter, an increase in pressure and with it, gas density, actually raises cleaning efficiency and lowers operating cost.

Summary of the invention

This invention provides an apparatus for applying electrostatic precipitation to gases at relative densities higher than generally considered possible, by furnishing means, to provide a stable corona over a wide range of relative densities, and by providing a method for establishing a corona at relative densities and voltages beyond the critical point and at voltages below the accepted corona-starting voltages.

The invention also provides means for reducing the relative density, where necessary, in the precipitator, and for mounting the electrical power supply in such a manner as to reduce the insulation and pressure-sealing problems involved in high-pressure applications.

It is still another object of this invention to provide an electrostatic precipitator operating at high relative densities by initiating a useful corona discharge at relatively low voltages.

It is still another object of this invention to provide an electrostatic precipitator operating at high relative densities by obtaining a useful corona discharge at relative densities exceeding the critical relative density.

It is another object of this invention to provide an electrostatic precipitator operating at high relative densities by adjusting together the relative density and voltage from a point below the critical relative density to an operational point above the critical relative density.

It is a further object of this invention to provide an electrostatic precipitator aperating at voltages above the conventionally-defined sparkover voltages by appropriate adjustments of the relative density and voltage from a point below the critical relative density and conventional sparkover voltage to a point above the conventional sparkover voltage.

It is still another object of this invention to furnish means to reduce the pressure-sealing and electrical-insulation problems involved in the high-voltage power supply and transmission system for an electrostatic precipitator at high pressures by providing an arrangement wherein the high-voltage power supply is located within the high-pressure gas volume.

It is yet another object of this invention to provide an electrostatic precipitator that is economical, efficient and commercially useful in the removal of suspended particles from gas of high relative density.

It is a further object of this invention to provide an apparatus for cleaning gas at high relative density by electrostatic precipitation which apparatus furnishes means to reduce the relative gas density in the particle-charging region of the precipitator.

It is still a further object of this invention to furnish means to reduce the corona-starting voltage in an electrostatic precipitator by heating the corona-discharge electrode and so reduce the relative density of the gas in the neighborhood of that electrode.

It is another object of this invention to furnish means to raise the critical relative density of the gas in an electrostatic precipitator by heating the corona-discharge electrode and so raise the temperature of the gas in the neighborhood of that electrode.

It is a further object of this invention to raise the critical relative density and/or lower the corona-starting voltage of the gas in an electrostatic precipitator by providing means to raise the temperature of the gas.

It is another object of this invention to provide means to reduce the corona-starting voltage of an electrostatic precipitator by a reduction in the static pressure of the gas being treated, said reduction in satic pressure being effected by an increase in velocity pressure.

These and other objects of the invention will become better understood by those skilled in the art by reference to the following detailed description when viewed in light of the accompanying drawings wherein like numerals in the figures and the text identify like components.

FIG. 11 is a perspective view, partly broken away, of the precipitator portion of the apparatus of FIG. 9;

FIG. 11a is an enlarged sectional view of a portion of a component of the precipitator of FIG. 11.

An electrostatic precipitator typically consists of an electrode system producing a nonuniform electric field of sufficient intensity to ionize the gas at one electrode, or set of electrodes and so yield a corona discharge. The discharge may be either of positive or negative polarity, and serves as a copious source of ions of the polarity in question. The ions, in migrating across the interelectrode space under the action of the impressed electric field, may attach themselves to suspended particles carried in the gas between the electrodes. Such particles assume the charge of the attached ions, are attracted to the opposite or collecting electrode(s), and are precipitated out of the gas stream.

The electrostatic precipitator is outstanding in its ability to collect fine particles at very high efficiencies at relatively low power input, since it is essentially the particles alone that are subject to forces of separation, and not the entire mass of particle-containing gas as in the case of mechanical separator. But despite this well known advantage of electrostatic precipitators, these devices have been generally limited in application to the pressure range of from about atmospheric to about 160 p.s.i. and to the temperature range of about 0° F. to about 1200° F. The basis of this limitation is two-fold.

(1) Corona

The existence of a corona discharge requires that an electric field of a certain minimum intensity exist at the surface of the discharge electrode. In the prior art this field $E_c$ is calculated using a formula due to Peek $$E_c = A\delta + B(\delta/r)^{1/2} \qquad (1)$$

where A and B are constants of the gas, $\delta$ is the density of the gas relative to atmospheric conditions and $r$ is the radius of the discharge wire. Knowing the field $E_c$ it is then possible, by well known methods of classical electrostatics, to calculate the associated corona-starting voltage $V_c$. For coaxial cylindrical electrodes, a common precipitator embodiment, the voltage-field relation is $$V_c = E_c r \ln(R/r) \qquad (2)$$

where R is the radius of the outer collecting electrode. Corresponding formulas for other geometries e.g., planar collecting plates are known in the art. The Peek relation, Equation 1, has been shown to hold for both polarities, for many gases, over a range of relative densities $\delta$ from much less than unity up to several times unit. The calculated corona-starting voltage at very high $\delta$ corresponding, for example, to pressures of tens of atmospheres at room temperatures, is found to be inordinately great, often requiring ultrahigh-voltage power supplies and pressure vessels, insulators, and feedthrough bushings of such size as to be economically or technically prohibitive. It has been found that corona currents can be achieved at high pressure at voltages far below the voltages predicted by Peek's Equation 1.

(2) Sparkover

Figures 1, 2, 3, 4:
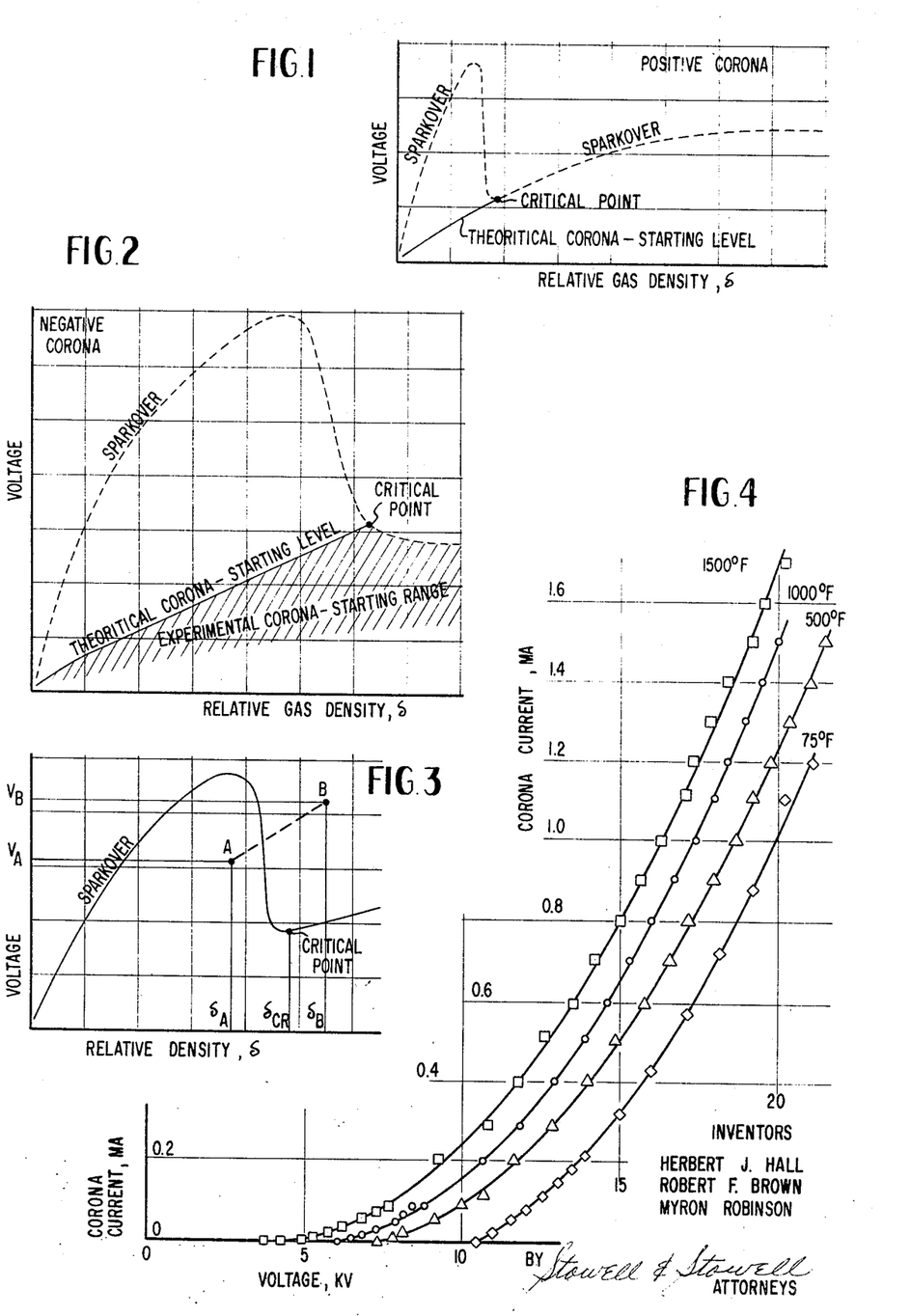
FIG. 1 is a graph of positive corona-starting and sparkover voltages as functions of relative gas density $\delta$ for a typical precipitator electrode geometry.
FIG. 2 is a graph of negative corona-starting and sparking voltages in terms of relative gas density $\delta$ for a typical precipitator electrode geometry.
FIG. 3 is a graph of sparkover voltage as a function of gas density for either polarity for a typical precipitator electrode geometry.
FIG. 4 is a graph of corona current as a function of voltage for coaxial wire-tube electrodes, the wire being heated to various temperatures.
Figure 2:
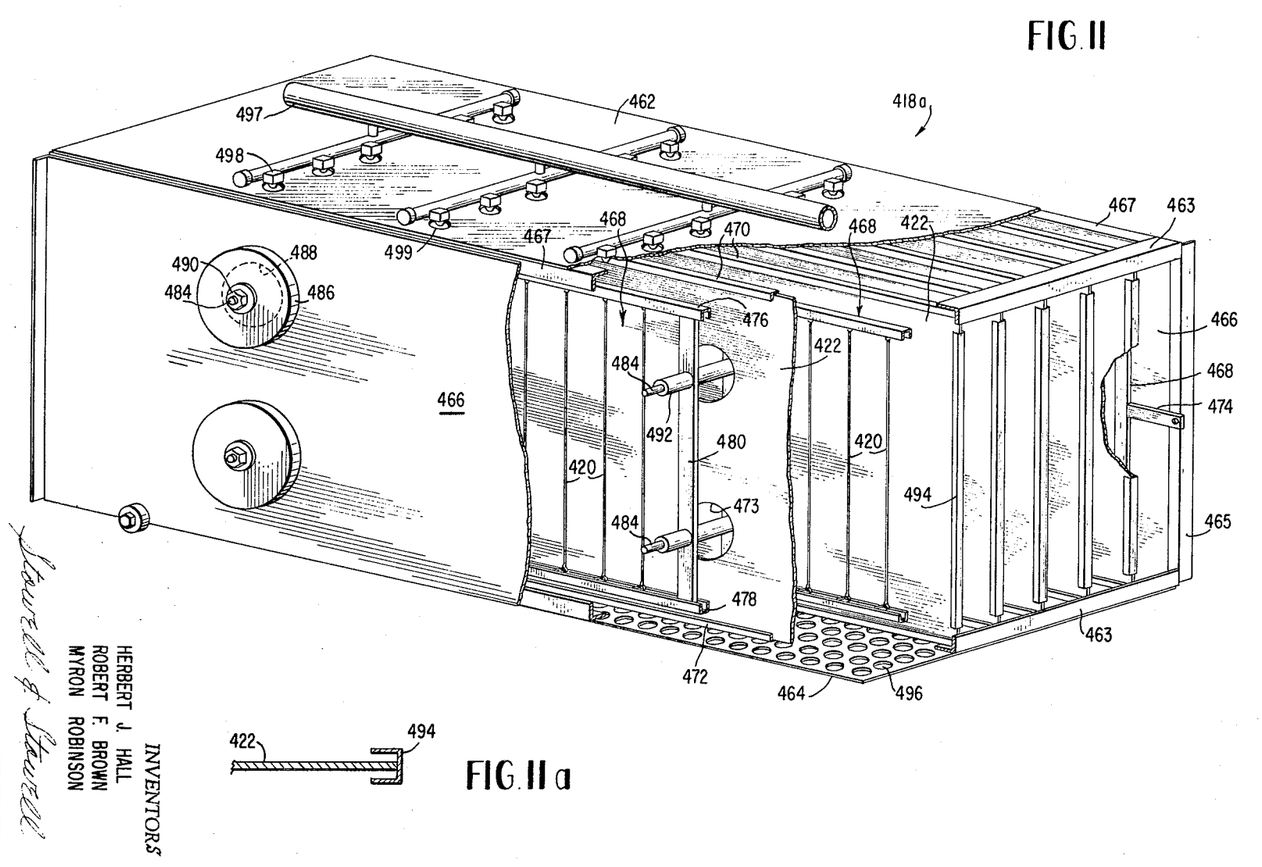

The higher the operating voltage of a precipitator, the greater is its efficiency. The maximum operating voltage is the voltage at about which sparkover occurs. The sparkover voltage is low at very low values of relatively density $\delta$; it increases to a maximum as $\delta$ is raised, and then it decreases as $\delta$ is raised still further. Eventually, the corona-starting and sparkover voltages coincide. This point of coincidence is termed the critical point and the corresponding relative density, the critical relative density $\delta_{cr}$. For a positive discharge, the critical point is fairly well defined and is a function of gas composition, gas temperature, electrode geometry and electrode contaminants. Typical positive corona-starting and sparkover voltages as functions of $\delta$ are shown in FIG. 1. The theoretical corona-starting curve is given by Peek's relation and is in agreement with experiment. At values of $\delta$ above $\delta_{cr}$, only sparkover without corona occurs; consequently beyond $\delta_{cr}$ conventional electrostatic precipitation is not possible. In a variety of practical conditions, $\delta_{cr}$ for a positive discharge occurs very roughly in the neighborhood of 10 corresponding to a pressure of about 160 p.s.i. at room temperature. Negative sparkover voltage and critical points differ strikingly from their positive counterparts, and a significant negative corona is indeed possible not only above the positive $\delta_{cr}$ but above the negative $\delta_{cr}$ as well as shown in FIG. 2.

In an electrostatic precipitator the collection of charged particles is effected by a separating force which is proportional to the product of the charge on the particle and the intensity of the collecting electric field. Both the particle charge and the field intensity increase with increasing applied voltage. Consequently, other factors being equal, precipitation efficiency increases with voltage as long as the sparkover level is not exceeded. Since a corona discharge is essential to particle charging in a precipitator, and since the corona fails in the presence of sparking, excessive sparkover represents the voltage of maximum precipitator efficiency.

In FIG. 1, which gives data for a positive discharge, the unbroken curve, labeled "theoretical corona-starting level" is calculated from Peek's Equation 1 and is in good agreement with experiment. The sparkover curve, determined experimentally, is shown as a broken line. The critical point is the intersection of the corona and sparkover curves. In the positive-discharge case illustrated in FIG. 1, conventional electrostatic precipitation is possible only at combinations of voltage and relative density above the corona-starting curve and below the sparkover curve, and at relative densities below the critical relative density.

FIG. 2 shows negative corona-starting and sparkover voltages as functions of relative gas density for the same electrode system, gas, and other experimental conditions employed in FIG. 1. The scales of the coordinate axes are also identical in the two figures. The following very striking differences are noted.

(1) Negative corona-starting voltages are not necessarily predicted by Peek's Equation 1 as are positive corona-starting voltages. Instead, negative corona may start over a broad range of voltages extending from a maximum given by Peek's Equation 1, represented in FIG. 2 by the unbroken curve labeled "theoretical corona-starting level," to a value that may be only a small fraction of that maximum. The experimental negative corona-starting voltages are not sharply defined and depend upon the constantly varying microstate of the discharge-electrode surface. The higher the relative density, the greater the difference is likely to be between the observed and theoretical negative corona-starting voltages.

The positive corona-starting voltage, as shown in FIG. 1, is, on the other hand, rather sharply defined.

(2) A comparison of FIGS. 1 and 2 shows further that although the positive and negative sparkover voltages do not differ markedly at low or moderate relative densities, at relative densities exceeding the positive critical value, the negative sparkover voltage rises far beyond the maximum attainable positive sparkover value. Indeed, the maximum negative sparkover voltage has been observed to exceed the maximum positive sparkover voltage by a factor of two or more.

(3) A further comparison of FIGS. 1 and 2 shows that the critical relative density for the negative corona far exceeds the critical relative density for the positive corona.

At ordinary relative densities, precipitators may be run at either polarity sometimes positive corona is preferred, sometimes negative. At high relative densities, however, the advantages of negative corona outweigh those of positive to a substantial degree. It has been further found that negative corona-starting voltages are much lower than positive; maximum negative sparkover voltages are much higher than positive; negative critical relative densities are much higher than positive; and gases over a much broader range of relative densities can be cleaned by precipitators having negative corona rather than positive.

For example, referring to FIGS. 1 through 3, if it is required to clean a gas by precipitation at relative density $\delta_B$, and that in order to achieve a required efficiency, it is necessary to operate at a voltage $V_B$, when by the well known standards, electrostatic precipitation would not appear to be possible. However, it has been discovered that the following method for effecting electrostatic precipitation beyond either the conventional sparkover voltage, the critical relative density, or both is feasible. First the precipitator is brought to voltage $V_A$ and relative density $\delta_A$, as shown in FIG. 3, the point ($V_A$, $\delta_A$) giving a usable corona discharge at a voltage below the critical value. Next, maintaining the current constant, while simultaneously adjusting the voltage and relative density, the precipitator is brought along the broken line in the figure from point A to point B, i.e., from ($V_A$, $\delta_A$) to ($V_B$, $\delta_B$). If point B is not excessively removed from point A, a usable corona discharge will still obtain at point B despite the fact that both the critical relative density and the sparkover voltage have been exceeded. It is to be noted that maintaining the corona current constant in this operation in moving from point A to point B is illustrative and not essential; it is necessary only that the current be maintained at a signfiicant level.

While an electrostatic precipitator may be operated above the critical relative density if the relative density of the gas to be treated exceeds the critical relative density, it may instead be preferable, in certain applications, to increase the critical relative density to a value above the relative density of the gas. Taking as an illustrative example the common precipitator and electrode configuration of concentric cylinders, the critical relative density $\delta_{cr}$ is given empirically by $$\delta_{cr}=k[(1/r)+c] \qquad (3)$$

where $r$ is the wire radius and $k$ an increasing function of tube radius. The quantities $k$ and $c$ depend upon the nature of the gas and its temperature. It is clear that a reduction in wire (inner-cylinder) radius and/or an increase in outer-cylinder radius will raise the critical relative density. Thus, the critical relative density which, in a typical case, is $\delta_{cr}=8$ for 109-mil diameter wire, could be increased to $\delta_{cr}=67$ for 7-mil diameter wire. In general the 109-mil discharge wire commonly used in prior art commercial electrostatic precipitators is altogether unsuited to very high relative density precipitation when it is desired to operate below the critical relative density. Further the fine wires may be replaced by points, sharp edges or other geometries of correspondingly small radius of curvature to obtain a similar effect.

From the foregoing it will be seen that a useful range for the diameter of the fine wire discharge electrodes for the system would be from about 5 mils to about 30 mils at relative gas densities $\delta$ about 15 (about 200 p.s.i.) where the ratio of the spacing of the collecting electrodes to the wire diameter of the discharge electrodes is greater than 100. Throughout the specification and claims the term, "discharge wire diameter," is intended to include other than round wires thus in terms of the effective radius of curvature of the discharge electrodes the useful range would be 2.5 to 15 mils at relative gas densities $\delta$ above 15 when the ratio of the inter-electrode spacing to wire radius is greater than 100. These relationships hold for plate and fine wire electrodes and tubes and fine wire electrodes.

Still another means for enabling an electrostatic precipitator to operate at higher means relative gas densities is the following. If the corona-discharge electrode is heated, by an electric current, or other means, the temperature of the gas immediately adjacent to the wire rises and, consequently, its relative density decreases. Corona-starting voltage generally decreases with decreasing relative density and this effect of decreasing corona-starting voltage obtains in the regions in which Peek's Equation 1 is valid, and for the positive corona-discharge at all relative densities below the critical relative density. In the case of the negative corona at high relative densities, the effect, as shown in FIG. 2, is only generally valid. Consequently, the corona-starting voltage for a heated discharge electrode will, in general, be less than if that electrode were more nearly at the temperature of the ambient gas. It is pointed out that the mean relative density of the treated gas is not markedly changed; only the relative density of the gas adjacent to the heated discharge electrode is sharply affected.

Alternatively, the entire body of gas can be heated in order to reduce the relative density while maintaining high pressure.

The above described heat effect is shown in FIG. 4. The data was obtained with a 20-mil discharge wire in a 2%₃₂ inch tube 12 inches long. Corona current-voltage curves are shown for room air, the discharge wire being variously at 75° F., 500° F., 1000° F. and 1500° F. The electrodes were mounted with their axes vertical so that natural convection maintained the mean air temperature in the interelectrode space at roughly room temperature. It will be seen that the corona-starting voltage is strikingly altered by heating the wire; the corona-starting voltage drops by over 50% as the wire temperature varies from 75° F. to 1500° F.

There is yet another important temperature effect: The critical relative density of a gas rises with temperature, thus, raising the gas temperature, either locally at the wire surface by heating the wire, or throughout the gas by heating the main body of gas, will increase the critical relative density.

Heating the wire, the main body of gas, or both, thus has a two-fold advantage. On one hand, the corona-starting voltage is lowered, and on the other, the critical relative density is raised.

An additional benefit, the reduction or elimination of problems involving electrical insulation and feedthrough bushings, is provided by containing the high-voltage power supply within the volume of gas of high relative density. In general it has been the practice to furnish high-voltage power to an electrostatic precipitator treating a gas at other than atmospheric pressure, by feeding such power into the gas vessel housing the precipitator, by means of a high-voltage insulating bushing. Such bushings, being of ceramic or plastic, are fragile, and increase rapidly in size and cost, as voltage and pressure requirements rise.

Figure 5:
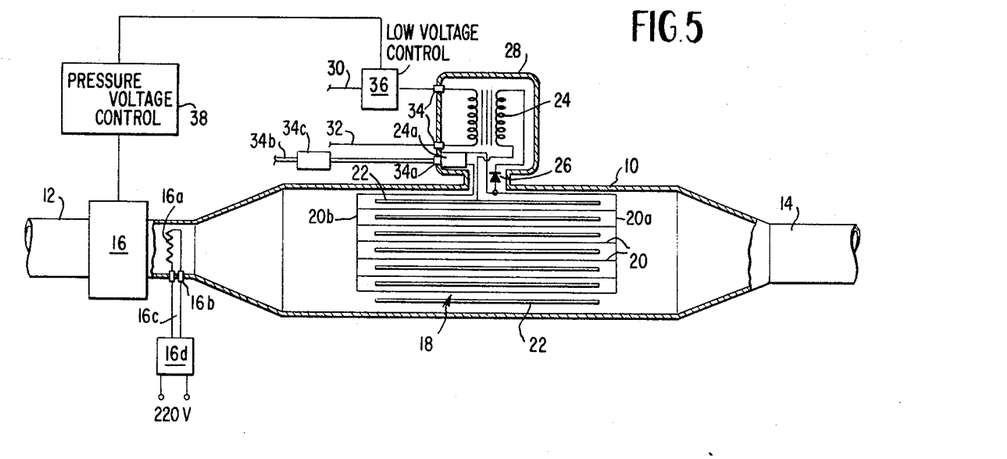
FIG. 5 is a schematic view of a precipitator in accordance with this invention installed in a high-pressure gas-transmission line.

Referring to FIG. 5 of the drawings, the general layout of one embodiment of the apparatus in accordance with the invention is shown schematically. The insulation comprises a pressure housing 10 connected at either end thereof to a gas inlet conduit 12 and a gas outlet conduit 14. The pressure of the gas flowing through the inlet conduit 12 is controlled by a variable pressure reducing means 16 disposed in the inlet conduit. Mounted in the housing, a precipitator assembly, shown generally at 18, comprises a plurality of corona discharge electrode wires 20 disposed between a plurality of spaced collector plates 22 or tubular collecting electrodes. A high-voltage power supply comprising a transformer 24, a voltage rectifier 26, and other associated circuitry not shown, are disposed in a pressure container 28 proximate the container 10 and in fluid communication therewith. Power is supplied to the transformer 24 through low voltage input leads 30 and 32 entering the container 28 through insulated pressure bushings 34, the input voltage and, therefore, the voltage level of the high-voltage supply being controlled by a suitable voltage control 36. Both the pressure reducer 16 and the low voltage control 36 are operable from a pressure-voltage control means 38 for simultaneous control, if required, of the voltage level and pressure in the container 10. A low-voltage, high-current power supply 24a is also furnished for use, if required, in heating the discharge wires. This power supply 24a is also contained within the pressurized container 28, is connected to the discharge electrodes 20 by wires 20a and 20b. External power to the heater power supply is furnished by leads 34b which enter the pressure vessel through pressure glands 34a. Wire-heater power is regulated by control device 34c.

A heater 16a for raising the temperature of the main body of gas is also provided for use as required. Relatively low voltage gas heating power is fed by means of leads 16c through pressure glands 16b into the pressurized system. The gas heater is regulated by control device 16d external to the pressurized system.

Figure 5A:
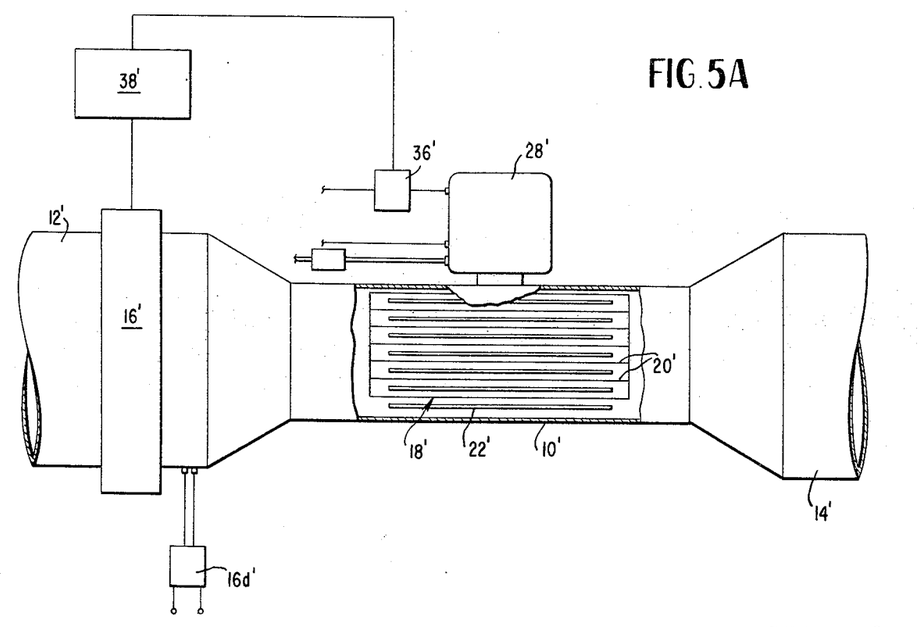
FIG. 5a is a view similar to FIG. 5 of a modified precipitator.

Reduction of the static pressure in the precipitator for the purpose of lowering the corona-starting voltage, and raising the corona current at a given voltage, may be effected by modifying the precipitator of FIG. 5 to make it conform to the design as shown in FIG. 5a. In FIG. 5a the corona-discharge electrodes 20' are in a gas-flow path of smaller cross section than the entrance and exit conduits 12' and 14'. In passing from the inlet conduit 12' to the precipitator housing 10', the gas in FIG. 5a undergoes a rise in velocity head and, consequently, a loss in static head. The relative density of the gas, therefore, decreases as the gas passes through the corona-discharge region. Thus, the corona-starting voltage is lowered and brought into a more readily attainable range.

Figure 6:
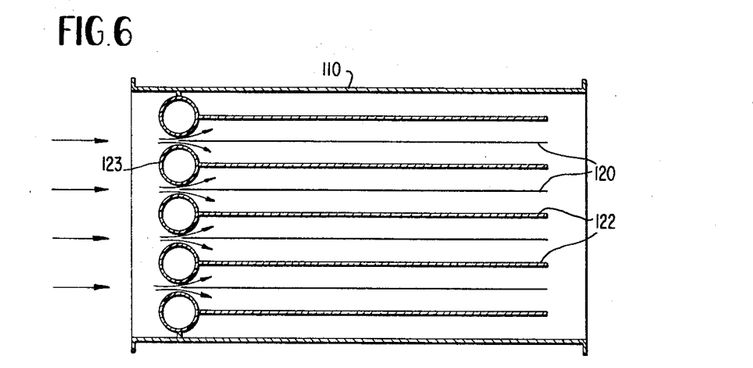
FIG. 6 is a sectional view, in elevation, of the precipitator portion of another apparatus in accordance with the invention.

Referring to FIG. 6 of the drawings, a top view of a duct type precipitator is shown. Components of the embodiment of FIG. 6 corresponding to those of the previously described embodiment are indicated by like numerals of the next higher order. The precipitator comprises a housing 110 enclosing a plurality of corona discharge electrode wires 120 disposed between spaced collector plates 122. The collector plates are provided, proximate their leading edge, with enlarged cylindrical members 123 which are spaced and formed to cooperate with one another and create a reduced passage or constriction therebetween through which the flow of gas as indicated by the arrow in that figure is accelerated. In accordance with the well known Bernoulli theorem, the increase in velocity of the gas produces a decrease in the static pressure at the point of increased velocity. A corona may, therefore, be established at the point of constriction at a voltage significantly below that which would be required either upstream or downstream of the constriction. Indeed, the reduction in relative density of the gas may lead to the establishment of a corona discharge which otherwise would be impossible at the relative density prevailing upstream or downstream of the constriction. The configuration of the members 123 can be varied from the cylindrical shape illustrated without varying the operation of the invention.

Figure 7:
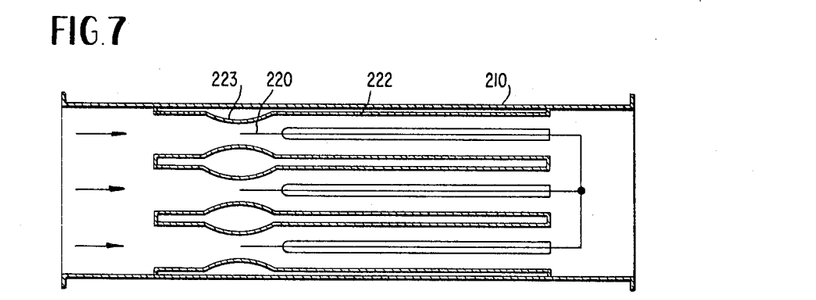
FIG. 7 is a view similar to FIG. 6 of another apparatus in accordance with the invention.

Referring to FIG. 7, a tube-type precipitator is illustrated. Again, components corresponding to like components of the preceding embodiments are indicated by like numerals of the next higher order. In this figure the requisite constriction is provided by a reduced diameter portion in the tubes 222 in the area of the discharge electrodes 220 to produce increased velocity and reduced pressure conditions in the gas flowing in the area of the corona discharge.

Where liquid contaminants are to be collected the tube-type precipitators shown in FIGS. 6 and 7 would preferably be arranged with the axes of each of the tubes positioned vertically so that the collected droplets may be more effectively removed from the inside surfaces of the tubes without causing spark-over or reintrainment of the collected liquid.

Figure 8:
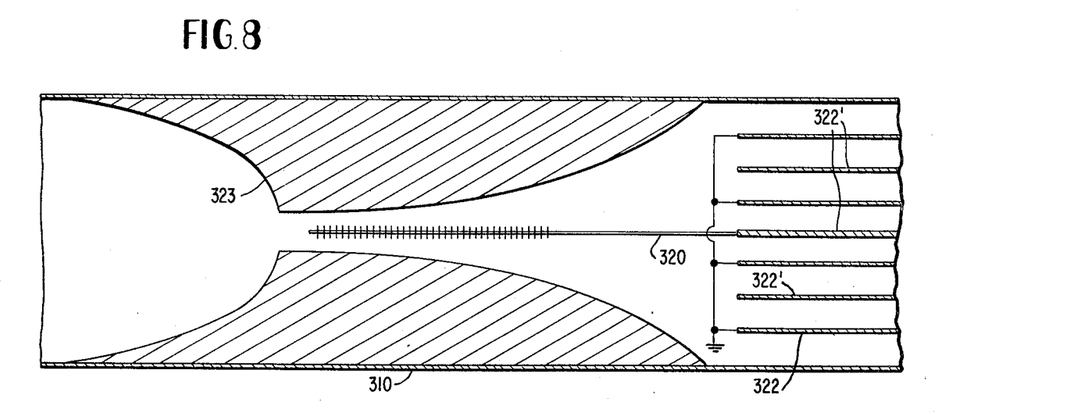
FIG. 8 is a view similar to FIG 7 of still another apparatus in accordance with the invention.

Referring now to FIG. 8 of the drawings, the above-described pressure reduction principle is illustrated as applied to a two-stage electrostatic precipitator. This embodiment comprises a housing 310 containing a first-stage charging section including a discharge electrode wire 320 centrally disposed in a Venturi throat formed by inwardly extending walls 323. A second-stage collecting section contains a plurality of spaced collector plates 322 which form the collecting surface for the precipitator. In the two-stage apparatus illustrated, the corona is established on the electrode 320 in the throat of the Venturi at the point of maximum gas velocity and minimum gas pressure. The particulates are charged as they pass through the Venturi and are attracted to the collector plates 322 as the gas passes through the collecting section.

In this embodiment alternate plates 322 would be grounded and while plates 322' would be connected to a source of high voltage as shown in the drawings.

As has been set forth above, this invention provides various means for applying the principle of electrostatic precipitation to gases of high relative density by applying one or more of the following principles:

The use of negative corona to raise the sparkover voltage and/or the critical relative density.

The use of fine discharge wires or other electrodes of small radius of curvature and/or appropriate interelectrode spacing to raise the sparkover voltage and/or the critical relative density.

The use of heated discharge electrodes and/or gas heaters to lower the corona-starting voltage and/or raise the critical relative density.

The use of a flow constriction to convert static head to velocity head, thereby lowering the corona-starting voltage.

The incorporation of the high-voltage power supply within the high relative-density gas volume to minimize problems posed by electrical insulation and feedthrough bushings.

The use of negative corona at voltages significantly below corona-starting voltages anticipated on the basis of the prior art.

The attainment of negative or positive corona at relative densities beyond the critical relative density and/or at voltages above the conventional sparkover voltage by appropriately adjusting voltage and relative density together.

The attainment of negative corona at relative densities beyond the critical relative density by utilizing the anomalously low corona-starting voltage described herein but unknown in the prior art.

DESCRIPTION OF THE PREFERRED EMBODIMENT

A commercial application in which electrostatic precipitators in accordance with the present invention will find particular utility is in the area of gas transmission. In gas transmission, particularly where long distances are encountered in cross-country transportation, the gases transmitted are subject to contamination with hydrocarbon lubricant oil and condensed hydrocarbon vapor from the gas pumping apparatus. This contamination is particularly troublesome and becomes cumulative when the transmission lines are serviced by multiple booster pump stations spaced along the transmission line. Over a period of time, the contaminant oil collects in the pipe lines causing a significant reduction in gas transmission efficiency and it has, therefore, become of extreme importance that some means be found to remove this contaminant from the gas flow subsequent to each pumping operation thereon.

The electrostatic precipitator is adapted to be particularly useful for such a purpose due to the inherent low pressure drop imposed on the flowing gas stream thereby.

In general gas is transmitted, cross-country, in high pressure lines at pressure of from about 300 to 1500 p.s.i.

Figure 9:
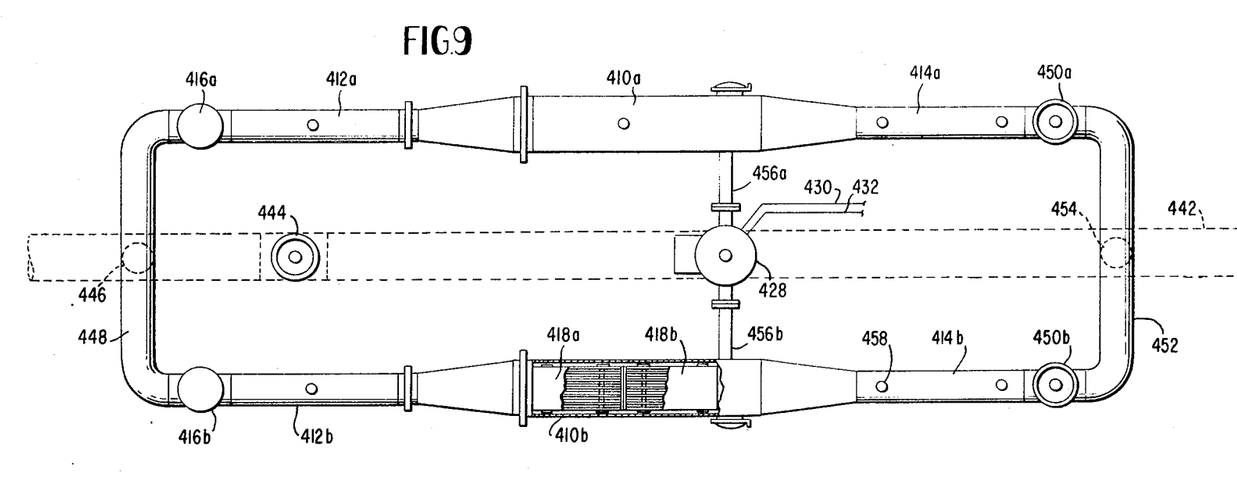
FIG. 9 is a plan view, partly in section, of yet another apparatus in accordance with this invention, connected to a high pressure gas line.
Figure 10:
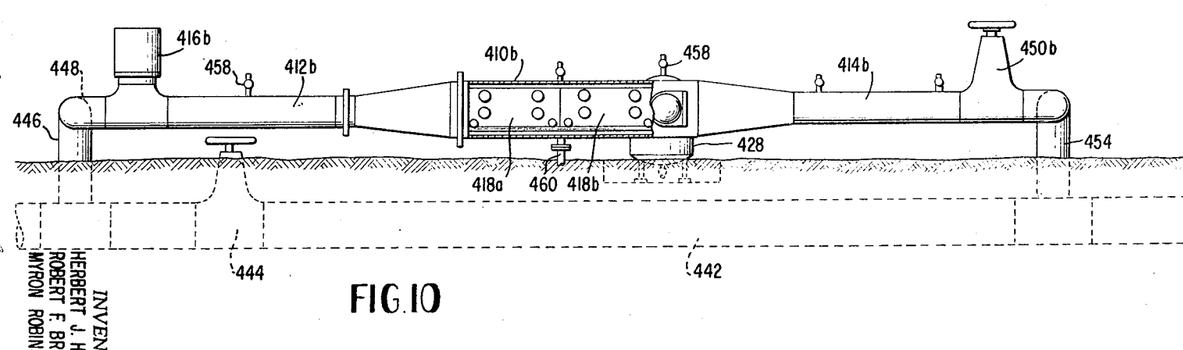
FIG. 10 is an elevational view, partly in section, of the apparatus in FIG. 9.

Referring now to FIGS. 9 and 10 of the drawings, as in the aforesaid embodiment, components of the embodiment, as illustrated in FIGS. 9 and 10 corresponding to those of the previously described embodiment are illustrated by like numerals only of the next higher order.

In the illustration, a gas transmission line 442, interruptible by a standard gate valve 444, has connected thereto, upstream of the gate valve, a vertical by-pass pipe 446. The pipe 446 is connected to an inlet distribution pipe 448 connected at either end thereof to inlet conduits 412a and 412b through valves 416a and 416b which may be either pressure reducing or gate type. The inlet conduits 412a and 412b communicate with enlarged precipitator containers 410a and 410b which, in turn, communicate with outlet conduits 414a and 414b and, through outlet gate valves 450a and 450b, to an outlet connection pipe 452. The connection pipe is communicative with the gas transmission line 442, on the downstream side of the gate valve 444, through a vertical exhaust pipe 454. The aforedescribed piping and valving provides for by-pass of the containers 410a or 410b if so required.

A pressure container 428, disposed between the container 410a and 410b, houses a high voltage power supply, such as a transformer, which is energized through the conductors 430 and 432 from a suitable source of low voltage (not shown). The container 428 is in fluid communication with the interior of the containers 410a and 410b through pressure transmission pipes 456a and 456b which also serve as conduits for the high voltage connecting rods between the high-voltage transformer-rectifier located in the container 428 to the interior of the containers 410a and 410b.

Each of the aforedescribed containers and communicating conduits are provided with suitably valved purging outlets 458 along the upper surfaces thereof. The containers 410a and 410b are furnished with precipitate drain points 460 at the bottoms thereof.

Each of the containers 410a and 410b is substantially identical and are operated simultaneously. By supplying each container with its own power supply container 428, they may be operated in alternate fashion if one precipitator need be shut down for cleaning, repair, servicing or replacement.

Referring now more particularly to the container 410b, it is seen that a pair of precipitator assemblies 418a and 418b are disposed in series therein. Each of the precipitator assemblies is identical, and, although specific reference is made hereinafter to the precipitator assembly 418a, what is set forth should also be understood as applicable to the precipitator assembly 418b.

Turning now more specifically to FIG. 11 of the drawings, the precipitator assembly 418a comprises a rectangular, open ended enclosure having top, bottom and side walls 462, 464 and 466, respectively. A frame, made up of interconnected channel members 463, 465 and 467, provides structural support for the walls. The structure formed by the aforedescribed walls and frame encloses a plurality of wire frames 468 disposed between a plurality of spaced collector plates 422 slidably mounted in upper and lower tracks 470 and 472. The plates 422 are provided with openings 473 therethrough.

The wire frame 468 located nearest the junction of pipe 456b and container 410b is provided with a horizontally extending electrode connector 474 to provide a connection point for the high voltage conductor extending coaxially through pipe 456b from the container 428.

The wire frames 468 are comopsed of upper and lower longitudinally extending U-shaped channels 476 and 478 interconnected by vertical bars 480. A plurality of corona discharge electrode wires 420 are strung between the channels 476 and 478 and are thereby electrically connected to the vertical bars 480. and are thereby electrically connected to the vertical bars 480. The bars 480 are provided with a pair of vertically spaced bores through which transverse tie rods 484 are disposed. The rods are electrically conductive, extend through openings 488 in the side walls 466 of the apparatus, and are insulated with respect thereto by insulators 486 situated thereon. Nuts 490 are threaded on the ends of the tie rods 484 to provide mechanical connection therefor. The bars 480 of the wire frames 468 are fixed with respect to one another in a transverse direction by tubular spacers 492 disposed around the tie rods 484.

The downstream edges of the plates 422 are provided with channel-shaped strips 494, as best illustrated in FIG. 11a to reduce re-entrainment of the precipitate collected on the plates.

The bottom wall 464 is provided with a plurality of openings 496 to provide for egress of the precipitate when flushed or otherwise stripped from the collector plates 422.

A wash-in-place system makes it possible to periodically, if required, wash the plates and wires of the precipitator without removing it from the pressure vessel shell. The system consists of a pipe manifold 497 rigidly mounted on cover 462 and having spray nozzles 498 extending through holes 499 in said cover. The inlet end of each spray manifold is connected to a pipe nipple which projects through the top wall of the containers 410a and 410b and terminates outside the containers in one of the purge valves 458. Flushing fluid, either water or a kerosene-type hydrocarbon solvent can be pumped through appropriate piping connected to valve 458.

In operation, the wire frames 468 are connected to a source of high voltage of energization of the discharge electrode wires 420 supported thereby and through the tie rods 484 to intermediate wire frames 468 and thence to the discharge electrode wires 420 thereof. A corona is then established around each of the wires 420 and particles passing therethrough are charged thereby and collected on the collector plates 422 in a manner well known in the art. The precipitate collected on the plates 422 is stripped from the plate 422 by gravity, periodic rapping, flushing or other suitable means known in the art, and discharged trough the openings 496 in the bottom wall 464 for subsequent drainage through the drain points 460. By reference again to FIGS. 9 and 10, it is seen that the pair of precipitator assemblies 418a and 418b disposed in the containers 410a and 410b act in series on gas flowing therethrough to charge and collect suspended oil mist in the stream of transmitted gas.

Specific tests have been made of apparatus constructed in accordance with this invention as set forth hereinabove. In the tests, efficiency measurements were made on a precipitator operated over a range of voltages and gas velocities at fixed gas conditions and current-voltage characteristics were determined over a range of gas conditions. The test unit consisted of a bundle of five tubes, two feet in length and three inches in diameter. Each tube was provided with a centrally positioned corona discharge wire formed of tungsten and each wire was about .010 inch in diameter. The total collecting area for the unit was 7.7 square feet. The first test was conducted at precipitator gas velocities ranging between 7.8 and 9.4 feet per second with gas pressures ranging between 833 to 849 p.s.i. The concentration of oil mist in the gas stream was between 27.6 and 51.8 gr./$10^6$ s.c.f. or 0.0015 to 0.0027 gr./cf.

With an imposed voltage of between 50 and 90 kv. at 0.2 to 1.8 ma., precipitator performance was in the range of 99% collecting efficiency.

In a second test, with precipitator velocities varying from 4.4 to 13.3 feet per second and with gas pressures from 834 to 852 p.s.i.a., precipitation in the 80% range of efficiency was obtained with voltages of between 76 and 82 kv. at .6 to .9 ma. and an oil mist concentration of 70 to 186 gr./$10^6$ s.c.f.

What has been set forth above is intended primarily as exemplary of teachings in accordance with the invention to enable those skilled in the art in the practice thereof.

What is new and, therefore, desired to be protected by Letters Patent of the United States is:

1. An apparatus for cleaning high relative density gas streams comprising: a first high pressure chamber, a transformer in the chamber and having primary and secondary windings, a second high pressure chamber said first and second chamber defined by wall means, said second chamber provided therein with an electrostatic precipitator having discharge and collector electrodes, said precipitator energized by said secondary windings by way of a rectifier between the precipitator and the secondary windings, said second chamber having an inlet and an outlet for high pressure gas, said first and second chambers having their interiors coupled in fluid communication with each other, a high pressure gas in said chambers, said gas being the dielectric for said transformer coils, low voltage leads passing into said first chamber through said wall means to energize said primary windings.

2. The apparatus of claim 1 wherein said precipitator has discharge and collector electrodes and wherein said collector electrodes of said electrostatic precipitator carry means laterally adjacent the discharge electrodes of said electrostatic precipitator to constrict the flow of gas therealong and thereby reduce the static pressure therearound.

3. The apparatus of claim 1 wherein the discharge electrodes are negatively charged.

4. The apparatus of claim 1 including means for maintaining the electric field strength in said precipitator between 35 and 60 kv./inch.

5. The apparatus of claim 1 wherein the effective diameter of said discharge electrodes is between 5 and 30 mils and wherein the ratio of the spacing between the collecting electrodes and the diameter of the discharge electrodes is greater than about 100.

6. The apparatus of claim 1 including means to heat the discharge electrodes.

References Cited

UNITED STATES PATENTS

| | | |
|---|---|---|
| 1,908,897 | 5/1933 | Heinrich. |
| 2,050,367 | 8/1936 | Myhre _____________ 55—105 |
| 2,100,155 | 11/1937 | Beran. |
| 2,249,801 | 7/1941 | White _____________ 55—129 X |
| 2,264,495 | 12/1941 | Wilner _____________ 55—135 X |
| 2,704,134 | 3/1955 | White _____________ 55—105 X |
| 2,705,544 | 4/1955 | Richardson _________ 55—101 |
| 2,814,360 | 11/1957 | Beaver. |
| 2,867,285 | 1/1959 | Wintermute ________ 55—136 X |
| 2,873,000 | 2/1959 | Elam _____________ 55—139 X |
| 2,983,332 | 5/1961 | Vicard ____________ 55—128 X |
| 3,004,833 | 10/1961 | Loewen ___________ 55—120 X |
| 3,026,964 | 3/1962 | Penney ___________ 55—138 X |
| 3,054,245 | 9/1962 | Aron _____________ 55—139 X |
| 3,218,781 | 11/1965 | Allemann et al. ____ 55—152 X |
| 1,787,955 | 1/1931 | Rosencrans ________ 55—155 X |
| 2,730,195 | 1/1956 | Roberts ___________ 55—5 |
| 2,937,709 | 5/1960 | De Seversky _______ 55—137 |
| 3,395,193 | 7/1968 | Bruce et al. ________ 260—679 |

FOREIGN PATENTS

| | | |
|---|---|---|
| 629,665 | 10/1961 | Canada. |
| 1,055,710 | 10/1953 | France. |
| 882,803 | 11/1961 | Great Britain. |

OTHER REFERENCES

Strong, W.W.: "The Positive and The Negative Corona and Electrical Precipitation," Transactions of the American Institute of Electrical Engineers, vol. 32, June 1913, p. 1755.

White: Industrial Electrostatic Precipitation, Addison-Wesley Publishing Co., Inc., Reading, Mass., copyright 1963, pp. 86, 87, 91–97, 101, 106, 107.

D. TALBERT, JR., Primary Examiner

U.S. Cl. X.R.

55—105, 130, 138, 139, 146, 151, 154